March 7, 1933.  A. C. PICKETT  1,900,199
INSECT TRAP
Filed Nov. 10, 1930
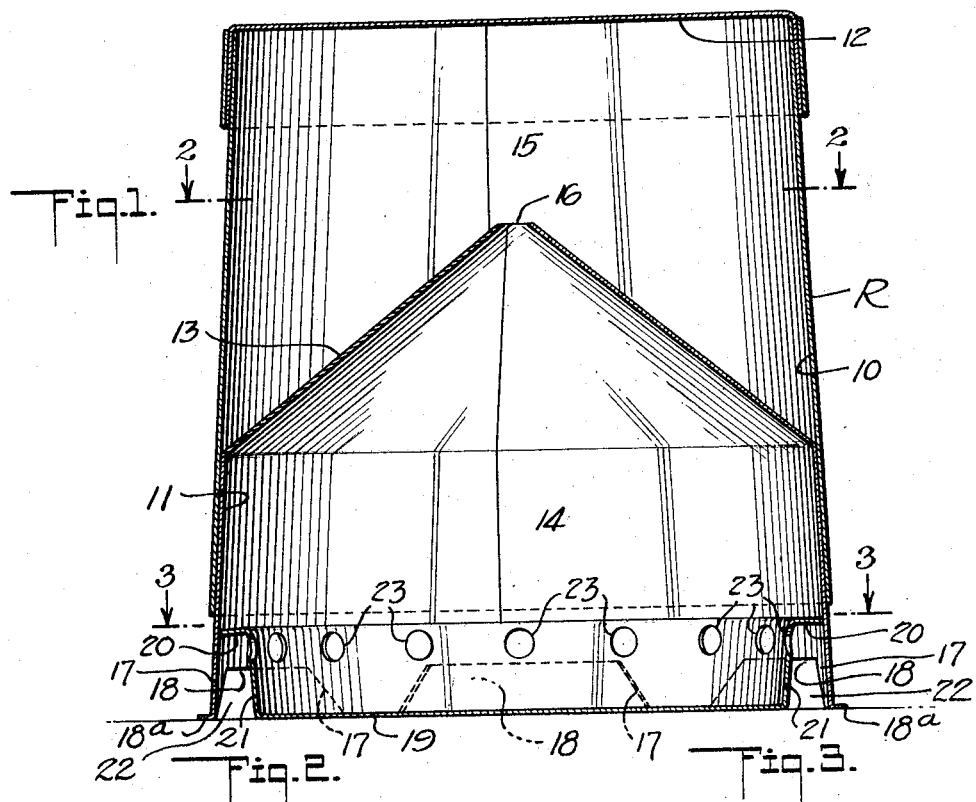
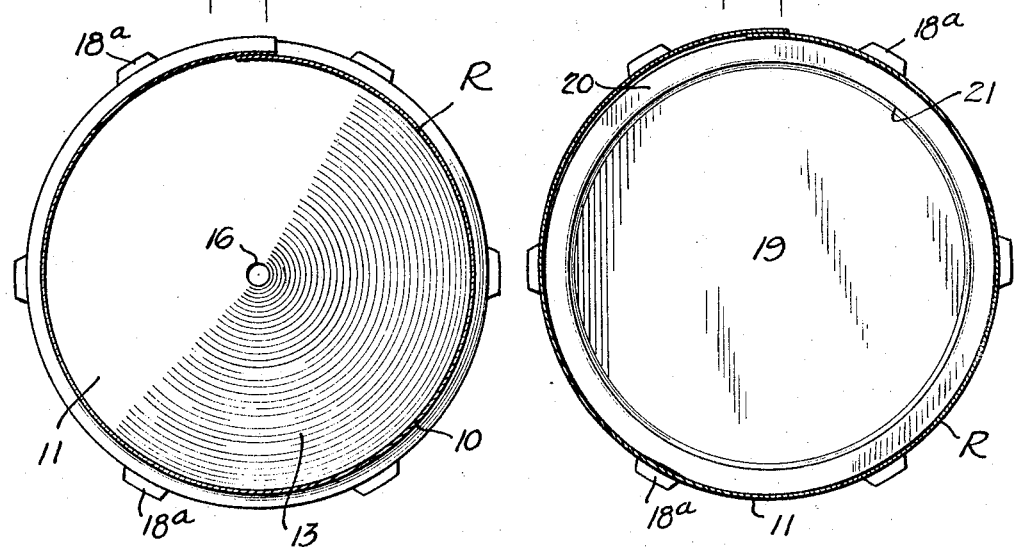
INVENTOR.
ANGELO C. PICKETT
BY
ATTORNEYS.

Patented Mar. 7, 1933

1,900,199

UNITED STATES PATENT OFFICE

ANGELO C. PICKETT, OF RIVERSIDE, CALIFORNIA

INSECT TRAP

Application filed November 10, 1930. Serial No. 494,722.

My invention relates to and has for a purpose the provision of a trap particularly adapted although not necessarily for the destruction of flies, and which when supplied with a suitable bait attractable to flies, is effective to confine against escape, the flies which enter the trap to feed upon the bait.

It is another purpose of my invention to provide a trap of the above described character which is constructed of inexpensive and readily destructible material so that after use for a short interval of time, the trap with its contents of flies, germs and filth, can be destroyed by burning or other suitable means, and replaced with a new trap, thus making the use of the trap entirely clean and sanitary.

It is a further purpose of my invention to provide an insect trap, the parts of which are capable of being nested with like parts of duplicate traps so that a large number of the traps can be stored and shipped in a small space.

I will describe only one form of insect trap embodying my invention, and will then point out the novel features thereof in claims.

In the accompanying drawing:

Fig. 1 is a view showing in vertical central section, one form of insect trap embodying my invention.

Fig. 2 is a horizontal sectional view on a reduced scale, taken on the line 2—2 of Figure 1 and looking in the direction of the arrows, and Fig. 3 is a horizontal sectional view on a reduced scale, taken on the line 3—3 of Figure 1 and looking in the direction of the arrows.

Referring specifically to the drawing, in which similar reference characters designate similar parts in each of the several views, my invention in its present embodiment comprises a receptacle R preferably constructed of relatively stiff paper or other suitable inexpensive material to provide a pair of sections 10 and 11, the former of which is of frusto conical form with its upper and smaller end closed by a cap 12. The lower and larger end of the section 10 is open and telescopically receives the section 11 to provide a snug fit between and frictionally connect the sections against separation. The section 11 is also of frusto-conical form and its upper end terminates in a conical portion 13 constituting a partition for dividing the receptacle into a lower bait compartment 14 and an upper trapping compartment 15 in communication with the bait compartment by means of an aperture 16 at the apex of the conical portion 13, of sufficient size for flies to pass from the bait compartment into the trapping compartment.

The lower and larger end of the section 11 is open and provided at circumferentially spaced intervals with feet 17 which elevate the receptacle from the support on which it is placed, a sufficient amount for flies or other insects to readily enter the bait compartment through the spaces 18 between the feet. The free extremities of the feet are provided with outwardly projecting tabs 18ª through which common pins or other suitable fastening members are adapted to be extended to secure the receptacle to the support on which it is placed, with sufficient security to prevent the receptacle from being displaced or blown over by the action of wind.

A bait holder in the form of a shallow pan 19 of frusto conical shape, loosely fits within the lower end of the section 11 to rest upon the support on which the receptacle is placed. The pan 19 is provided with a continuous flange 20 projecting radially outward from the upper edge of its vertical wall 21 into engagement with the inner wall of the section 11 to close the lower open end of the section 11 above the feet 17. The flange 20 tightly fits against the section 11 and sets up sufficient friction therewith to dispense with any fastening members through the tabs 18ª when the receptacle occupies a location free from any appreciable air disturbances.

The vertical wall 21 and the flange 20 of the bait pan co-act with the lower end of the section 11 and with the support on which the trap is placed, to define an annular passage 22 into which flies seeking bait in the pan enter through the spaces 18 between the feet. The vertical wall 21 of the bait pan is provided immediately below the flange 20 with a circular series of entrance openings 23 through which the flies are free to enter the compartment 14 from the passage 22 to feed upon the bait in the pan. The frusto conical portion of the section 11 is preferably constructed of substantially opaque material, whereas its conical portion 13 and the section 10 are preferably constructed of translucent or transparent material so that flies after feeding upon bait in the pan 19 will be attracted upwardly in the receptacle.

In the use of the trap, the bait pan 19 is first supplied with a bait suitable for attracting flies, and is placed upon a support at the desired location, after which the receptacle comprising the assembled sections 10 and 11, is placed over the bait pan to also rest on the support. Flies attracted by the bait in the pan 19 will freely enter the bait compartment 14 by passing successively through the spaces 18, passage 22, and entrance openings 23, and as the openings 23 of the bait pan are slightly above the lower edge of the section 11 there is no avenue of escape from the bait compartment except in a direction away from the light so that there will be very little tendency for the flies, after feeding, to pass out of the bait compartment through the openings. In their efforts to escape from the bait compartment after feeding, the flies will be attracted by light transmitted through the section 10 and conical portion 13 of the section 11, and will pass upwardly from the bait compartment through the aperture 16 in the conical portion 13, into the trapping compartment 15. Due to the conical form of the portion 13, the flies although readily passing upwardly through the aperture 16 do not pass downwardly therethrough, and are thus trapped against escape from the compartment 15.

With the trap constructed of paper or other inexpensive and destructible material, it can be destroyed with the trapped flies after a day of use, by burning or other suitable means, and replaced with a new trap, thus making the use of the trap highly sanitary.

The three parts of the trap when disassembled, can be readily nested with duplicate parts, so that a large number of traps can be shipped and stored in a comparatively small space. Furthermore the parts of the trap can be readily assembled and set up for use with the utmost ease and dispatch by a novice which is a decided advantage commercially in an article of this character.

Although I have herein shown and described only one form of insect trap embodying my invention, it is to be understood that various changes and modifications may be made therein without departing from the spirit of the invention and the spirit and scope of the appended claims.

I claim:

1. An insect trap comprising a receptacle including a frusto conical section closed at its smaller end and open at its larger end, a second frusto conical section frictionally fitting into the larger end of the first section and terminating at its smaller end in a conical portion constituting a partition for dividing the receptacle into a lower bait compartment and an upper trapping compartment, said conical portion having an aperture at its apex through which flies are free to enter the trapping compartment from the bait compartment, the larger end of the second section having feet providing spaces therebetween through which flies are free to pass, and a bait holder in the bait compartment closing the lower end of the latter and having entrance openings through which the flies are free to enter the bait compartment to feed.

2. An insect trap comprising a receptacle including a frusto conical section closed at its smaller end and open at its larged end, a second frusto conical section frictionally fitting into the larger end of the first section and terminating at its smaller end in a conical portion constituting a partition for dividing the receptacle into a lower bait compartment and an upper trapping compartment, said conical portion having an aperture at its apex through which flies are free to enter the trapping compartment from the bait compartment, the larger end of the second section having feet for elevating the receptacle from a support, to provide spaces between the feet through which flies are free to pass, a bait holder closing the bait compartment, and means defining entrance openings through which the flies are free to enter the bait compartment to feed, the feet having tabs through which fastening members are adapted to be extended to secure the receptacle to a support.

3. An insect trap comprising a receptacle including a frusto conical section closed at its smaller end and open at its larger end, a second frusto conical section frictionally fitting into the larger end of the first section and terminating at its smaller end in an apertured conical portion constituting a partition for dividing the receptacle into a lower bait compartment and an upper trapping compartment, the larger end of the second section having feet providing spaces therebetween through which flies are free to pass, and a bait pan loosely fitting in the second section and having a continuous flange projecting therefrom into engagement with the second section above the feet to define below the flange, an intervening darkened passage which the flies enter from the spaces between the feet, the bait pan having entrance openings below the flange through which flies are free to pass into the bait compartment from the passage.

4. An insect trap comprising a receptacle having an apertured partition therein dividing the receptacle into a lower bait compartment and an upper trapping compartment, the lower end of the receptacle being open and having feet between which flies are free to pass, and a bait pan received in the lower end of the receptacle to rest upon a support with the latter and having a continuous flange engaging the receptacle above the feet to define below the flange an intervening passage which the flies are free to enter from between the feet, the bait pan having entrance openings below the flange through which the flies are free to enter the bait compartment from the passage.

ANGELO C. PICKETT.